United States Patent
Monroe et al.

(10) Patent No.: US 10,661,503 B2
(45) Date of Patent: May 26, 2020

(54) THREE-DIMENSIONAL (3D) PRINTING

(71) Applicant: Hewlett-Packard Development Company, L.P., Houston, TX (US)

(72) Inventors: Michael G. Monroe, Corvallis, OR (US); Vladek Kasperchik, Corvallis, OR (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 218 days.

(21) Appl. No.: 16/064,098

(22) PCT Filed: Apr. 13, 2016

(86) PCT No.: PCT/US2016/027304
§ 371 (c)(1),
(2) Date: Jun. 20, 2018

(87) PCT Pub. No.: WO2017/180118
PCT Pub. Date: Oct. 19, 2017

(65) Prior Publication Data
US 2019/0009465 A1    Jan. 10, 2019

(51) Int. Cl.
*B29C 64/165* (2017.01)
*B33Y 10/00* (2015.01)
(Continued)

(52) U.S. Cl.
CPC ............ *B29C 64/165* (2017.08); *B28B 1/001* (2013.01); *B29C 64/214* (2017.08); *B29C 64/218* (2017.08); *B29C 67/00* (2013.01); *B33Y 10/00* (2014.12); *B33Y 30/00* (2014.12); *B33Y 40/00* (2014.12); *B33Y 50/02* (2014.12); *B33Y 70/00* (2014.12); *C04B 35/64* (2013.01)

(58) Field of Classification Search
None
See application file for complete search history.

(56) References Cited

U.S. PATENT DOCUMENTS

| 5,387,380 A | 2/1995 | Cima et al. |
| 6,596,224 B1 | 7/2003 | Sachs et al. |

(Continued)

FOREIGN PATENT DOCUMENTS

| EP | 0644809 | 7/2001 |
| EP | 2914563 | 9/2015 |
| WO | WO-2015-082923 | 6/2015 |

*Primary Examiner* — Mary Lynn F Theisen
(74) *Attorney, Agent, or Firm* — Dierker & Kavanaugh PC

(57) ABSTRACT

In a three-dimensional (3D) printing method example, build material granules are applied. Each of the build material granules includes a plurality of primary ceramic particles agglomerated together by a binder that is at least partially soluble in a primary solvent of a fusing agent. Pressure is applied to crush the build material granules. The fusing agent is selectively applied on at least a portion of the build material granules or the crushed build material granules to pattern the portion, and to introduce a latent binder to the portion. The application of the build material granules, the application of the pressure, and the selectively application of the fusing agent are repeated to create a green body. The latent binder is activated by heating the green body in order to produce a cured green body.

15 Claims, 4 Drawing Sheets

(51) Int. Cl.
  *B33Y 30/00*   (2015.01)
  *B29C 64/214*  (2017.01)
  *B29C 64/218*  (2017.01)
  *B28B 1/00*    (2006.01)
  *B33Y 70/00*   (2020.01)
  *B33Y 50/02*   (2015.01)
  *B33Y 40/00*   (2020.01)
  *B29C 67/00*   (2017.01)
  *C04B 35/64*   (2006.01)

(56) References Cited

U.S. PATENT DOCUMENTS

| | | |
|---|---|---|
| 2005/0087903 A1 | 4/2005 | Farr et al. |
| 2007/0087071 A1 | 4/2007 | Devos |
| 2007/0241482 A1 | 10/2007 | Giller et al. |
| 2010/0279007 A1 | 11/2010 | Briselden et al. |
| 2012/0237745 A1 | 9/2012 | Dierkes et al. |
| 2014/0183799 A1 | 7/2014 | Fischer et al. |
| 2014/0275317 A1 | 9/2014 | Moussa |
| 2015/0104346 A1 | 4/2015 | Nakamura et al. |
| 2016/0083360 A1* | 3/2016 | Chung ................ C07D 301/16 549/531 |
| 2016/0184891 A1* | 6/2016 | Mironets ............. B22F 1/0096 419/53 |
| 2017/0266880 A1* | 9/2017 | Matsubara ............ B33Y 10/00 |
| 2017/0326792 A1* | 11/2017 | Paternoster .......... B29C 64/141 |
| 2018/0339946 A1* | 11/2018 | Ottinger ................ B28B 1/001 |

* cited by examiner

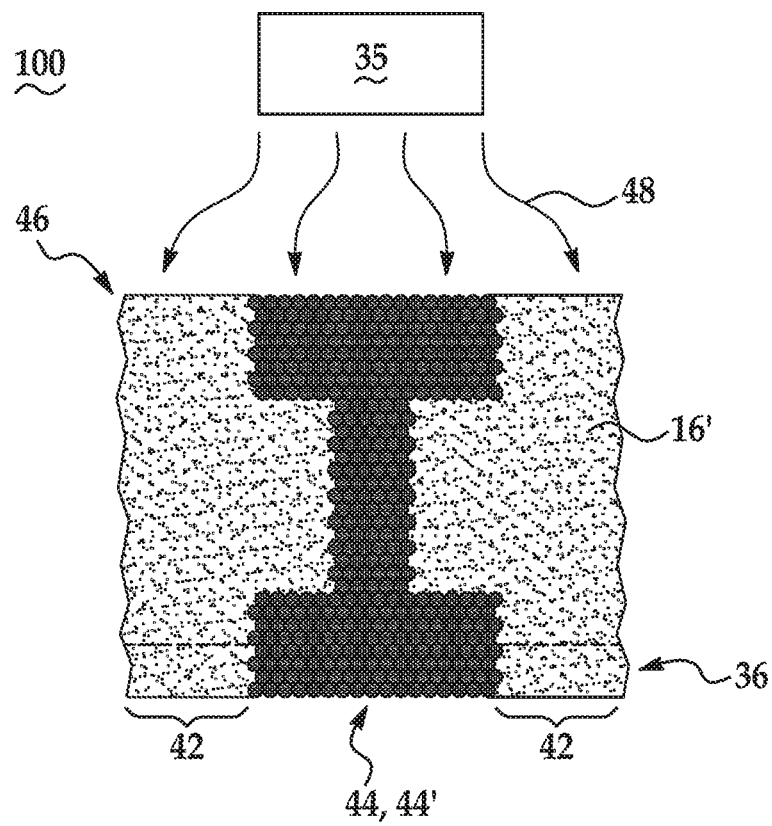
FIG. 2G
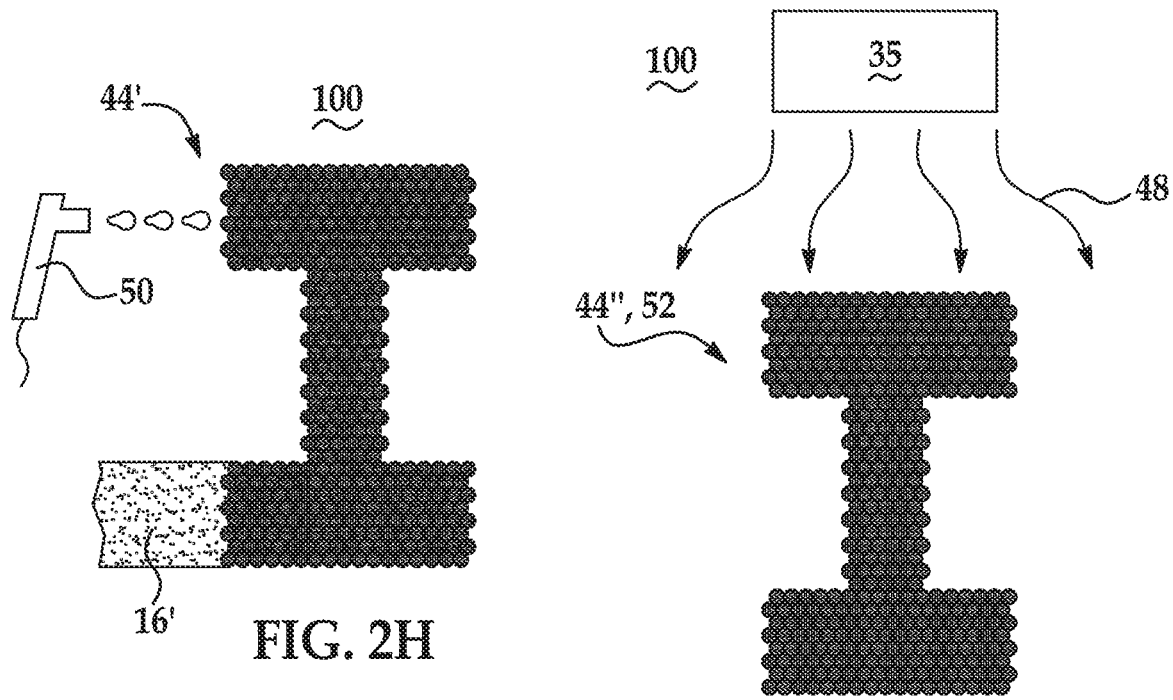
FIG. 2H
FIG. 2I

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A through 2I are schematic views depicting the formation of a cured green body, a densified green body, and a 3D object using examples of a 3D printing method disclosed herein.

DETAILED DESCRIPTION

Figure 1:
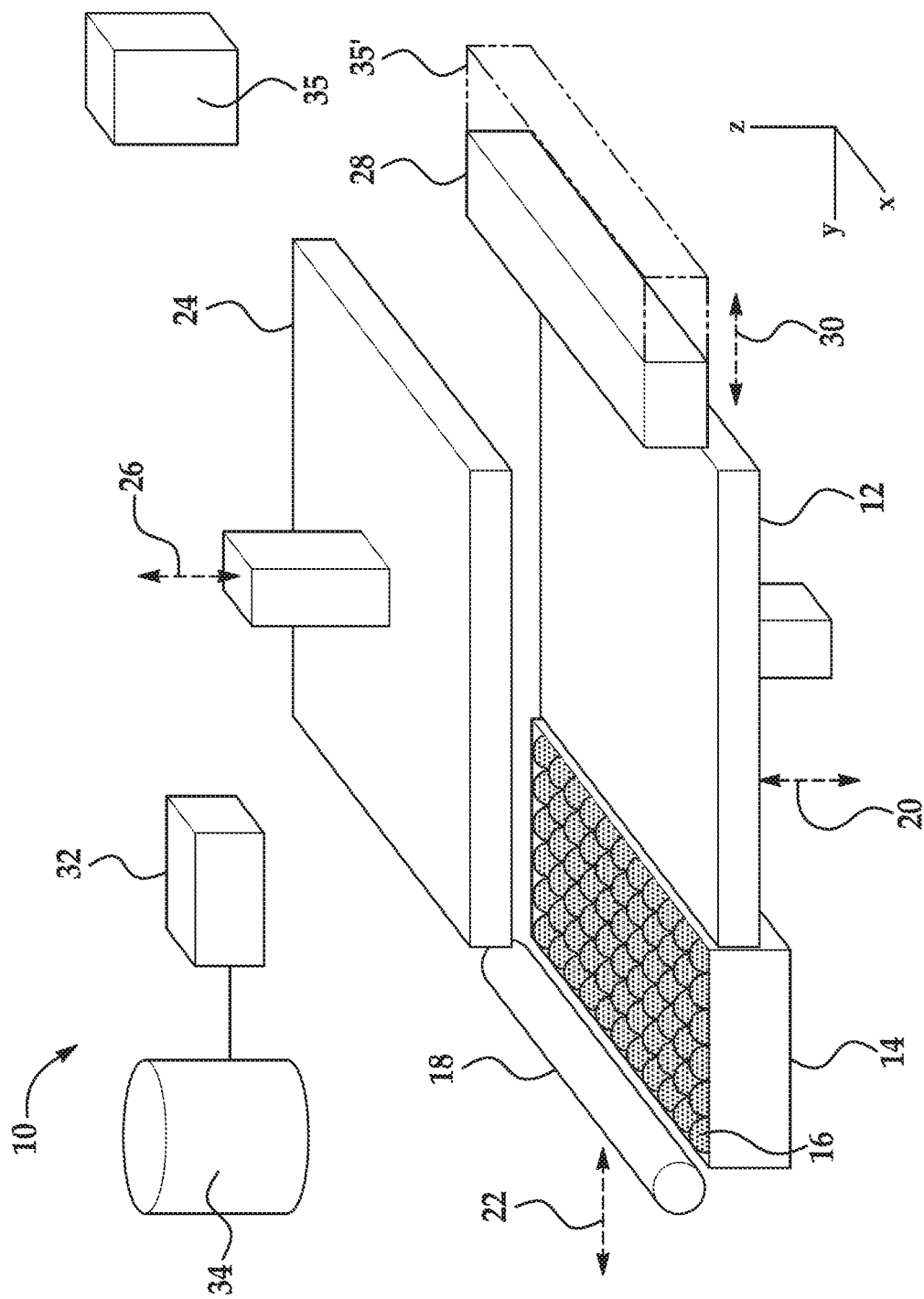
FIG. 1 is a simplified isometric view of an example 3D printing system.

In some examples of three-dimensional (3D) printing, a fusing agent (also known as a liquid functional agent/material) is selectively applied to a layer of build material, and then another layer of the build material is applied thereon. The fusing agent may be applied to this other layer of build material, and these processes may be repeated to form a green body of the 3D part that is ultimately to be formed. The fusing agent may include a binder that holds the build material together. The green body may then be exposed to electromagnetic radiation and/or heat to sinter the build material in the green body to form the 3D part.

The example 3D printing methods disclosed herein utilize a combination of build material granules, pressure application, and a fusing agent, which includes a latent binder, in order to produce a cured green body in a dry cake of pressed build material fragments (i.e., crushed build material granules). The cured green body can be removed from the dry build cake using a wet extraction process that does not deleteriously affect the structure of the cured green body. The extracted, cured green body can then undergo debinding and sintering to form the final 3D printed part/object. The final 3D printed part/object has a high extent of densification (up to 99% theoretical density) due, in part, to the small (typically <1 um, or <3 um at most) primary particle size of the build material, the pressure application and the relatively uniform spatial distribution of the latent binder in the cured green body.

Each build material granule is composed of primary ceramic particles and a binder that holds the primary ceramic particles together. The build material granules are large enough (e.g., ≥10 μm) to enable thin layers with well controlled uniformity to be formed during spreading of the build material granules. Additionally, the binder of the build material granules is selected so that it is at least partially soluble in a primary solvent of the fusing agent that is used during printing. Dissolution of the binder helps to break down the granular structure and enables higher structural uniformity of the green body that is built. Dissolution of the binder also facilitates easier wet extraction of the cured green body from the non-patterned build cake.

The application of pressure to the build material granules crushes the build material granules into smaller build material fragments. The smaller the fragments, the better. Some of the granules break down to the primary particles. In this regard, primary ceramic particles are in closer proximity to each other (than the granules), thereby increasing the packing density of the primary particles within the layer of build material, which enables more complete sintering. The compacted build material fragments also provide a stabilized surface for application of the fusing agent.

The application of pressure also eliminates macroscopic porosity that is present between the build material granules after spreading and before the pressure application, and produces a build material layer with predominantly microscopic porosity between the build material fragments. As such, pressure application replaces a smaller number of large diameter pores with a larger number of small diameter pores. Microscopic porosity facilitates uniform wetting and penetration of the fusing agent (and the latent binder) throughout the build material fragments, in part because the lack of large diameter pores prevents non-controlled wicking of the fusing agent outside of the patterned build material fragments.

Furthermore, the build material fragments are small enough (e.g., 3 μm) to enable complete solid state sintering and to sinter quickly (e.g., within about 1 hour to about 24 hours at a target temperature for the particles) in order to produce a 3D part.

The fusing agent includes a latent binder, which is dispersed throughout the primary solvent of the fusing agent. During application of the fusing agent, the latent binder is capable of penetrating into the microscopic pores of the layer of build material fragments. As such, the latent binder can move into the vacant spaces between the crushed build material granules. The latent binder can be activated or cured upon exposure to heat. When activated or cured, the latent binder is rendered insoluble in water or another solvent (e.g., the solvent of the fusing agent), and forms water-resistance phase bridges or solvent-resistance phase bridges between the fragments (e.g., primary ceramic particles). The activated or cured latent binder enables the cured green body to withstand wet de-caking and extraction without being deleteriously affected.

Through the combination of the combination of build material granules, the pressure application, and the latent binder of the fusing agent, ceramic materials may be formed into a fully densified and sintered 3D part while still being able to flow easily and be spread in uniform layers to receive the fusing agent. Accordingly, fine part details in 3D parts may be formed in a powder bed process.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing build material granules 16, and a build material distributor 18.

The build area platform 12 receives the build material granules 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 2A:
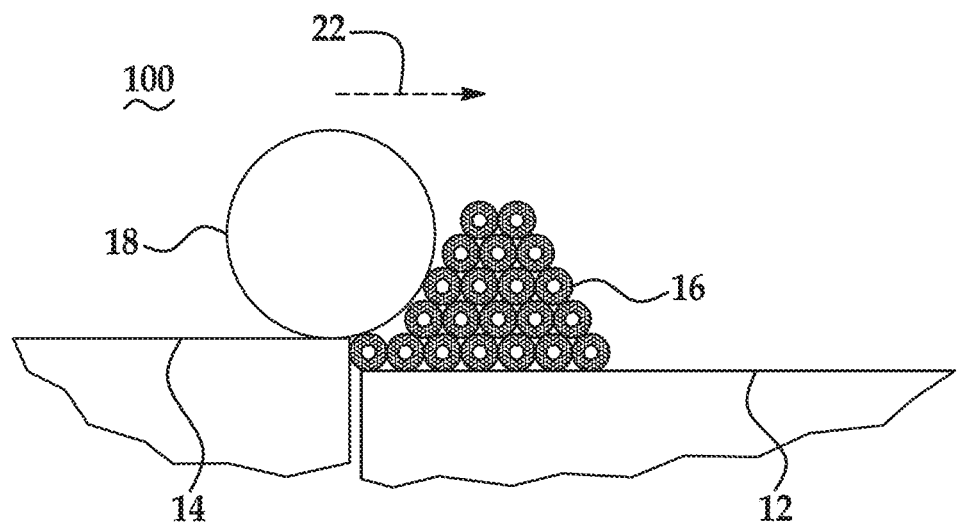
Figure 2B:
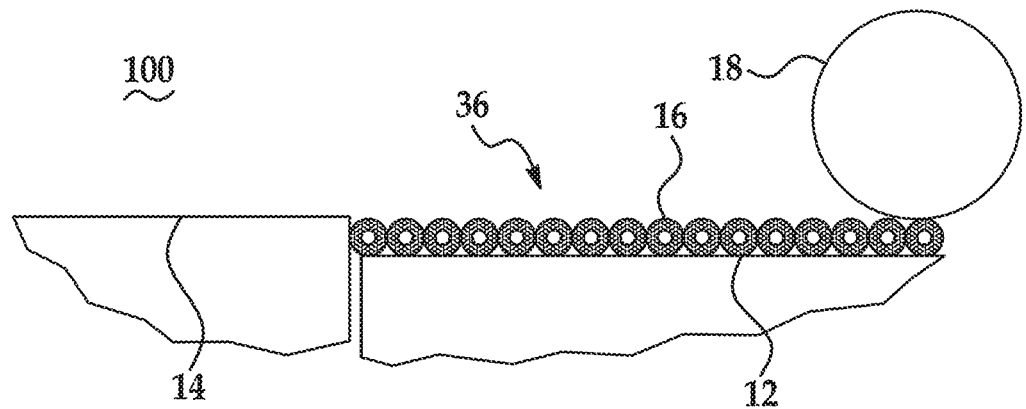
Figure 2C:
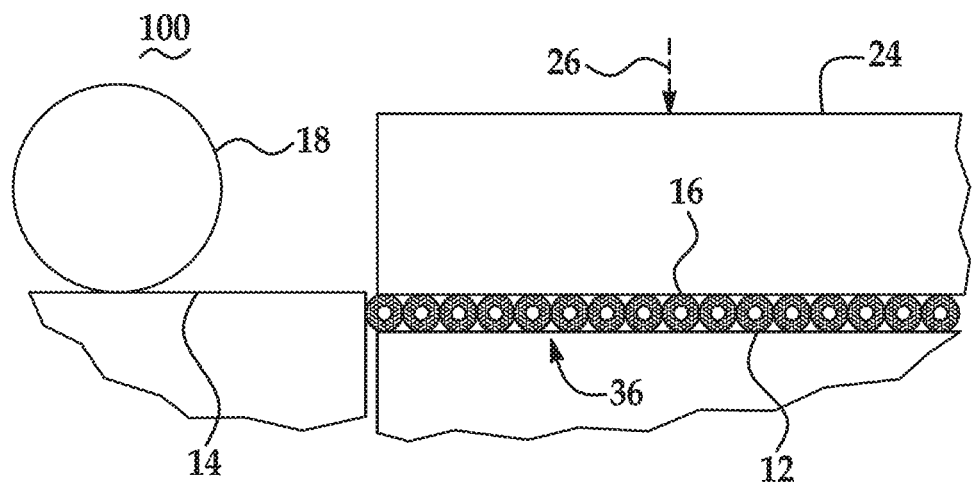
Figure 2D:
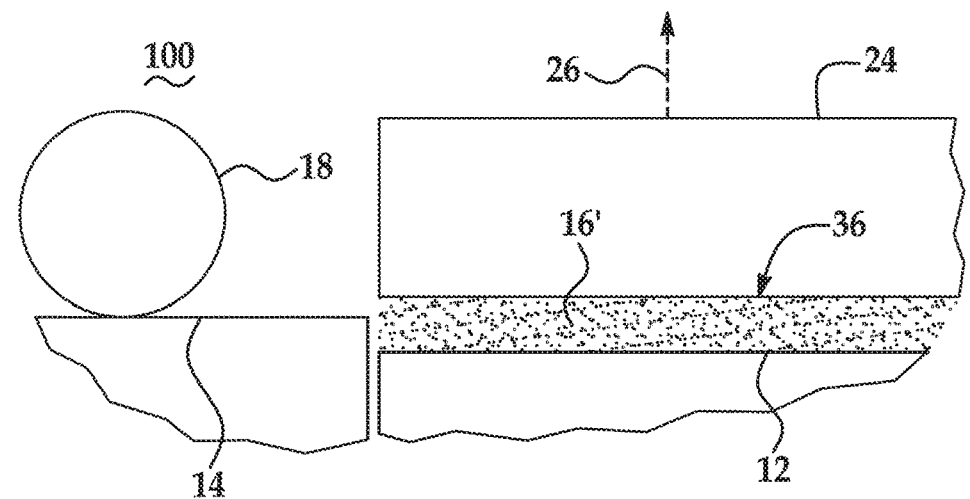
Figure 2E:
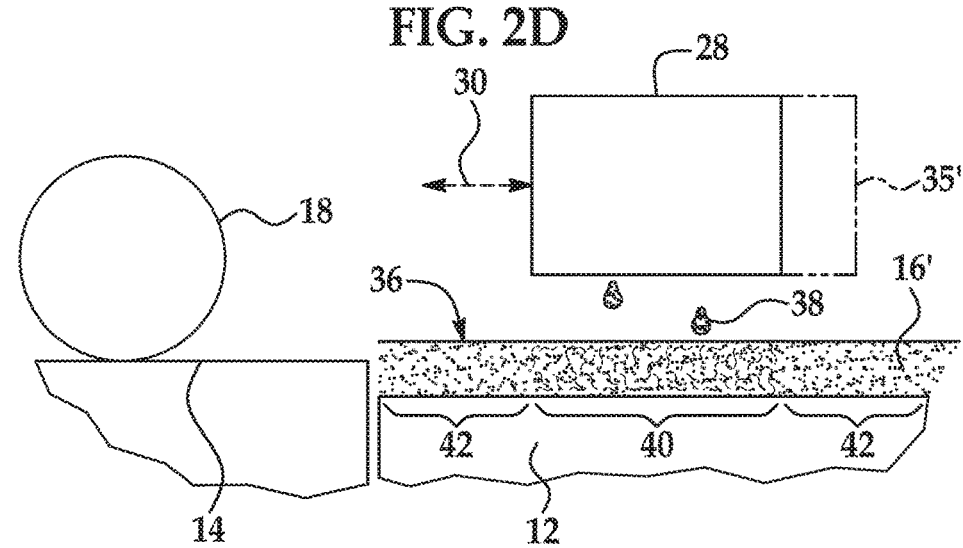
Figure 2F:
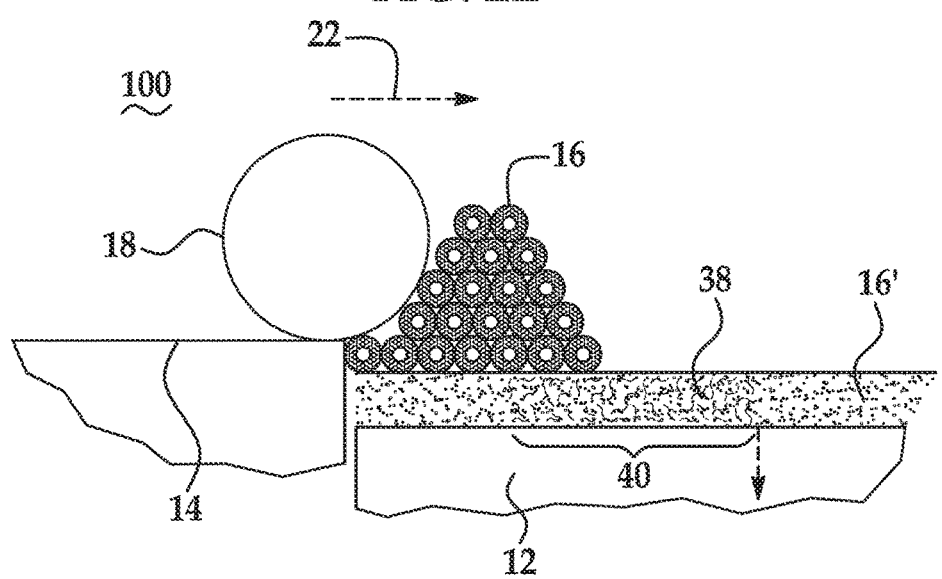

The build area platform 12 may be moved in a direction as denoted by the arrow 20, e.g., along the z-axis, so that build material granules 16 may be delivered to the platform 12 or to a previously formed layer of build material fragments (see FIG. 2F). In an example, when the build material granules 16 are to be delivered, the build area platform 12 may be programmed to advance (e.g., downward) enough so that the build material distributor 18 can push the build material granules 16 onto the platform 12 to form a layer of the build material granules 16 thereon (see, e.g., FIGS. 2A and 2B). The build area platform 12 may also be returned to its original position, for example, when a new part is to be built.

The build material supply 14 may be a container, bed, or other surface that is to position the build material granules 16 between the build material distributor 18 and the build area platform 12. In some examples, the build material supply 14 may include a surface upon which the build material granules 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material granules 16 from a storage location to a position to be spread onto the build area platform 12 or onto a previously formed layer of build material fragments.

The build material distributor 18 may be moved in a direction as denoted by the arrow 22, e.g., along the y-axis, over the build material supply 14 and across the build area platform 12 to spread a layer of the build material granules 16 over the build area platform 12. The build material distributor 18 may also be returned to a position adjacent to the build material supply 14 following the spreading of the build material granules 16. The build material distributor 18 may be a blade (e.g., a doctor blade), a roller, a combination of a roller and a blade, and/or any other device capable of spreading the build material granules 16 over the build area platform 12. For instance, the build material distributor 18 may be a counter-rotating roller.

The printing system 10 also includes a pressing die 24. The pressing die 24 may be positioned a spaced distance from the build area platform 12 along the z-axis, but close enough so that it can be moved into contact with the platform 12. The pressing die 24 may be lowered as denoted by the arrow 26, e.g., along the z-axis, to contact and apply pressure onto a layer of the build material granules 16 that has been formed on the surface of the build area platform 12. In an example, the pressing die 24 may apply sufficient pressure onto the layer of the build material granules 16 to crush the build material granules 16 into build material fragments (which may include intact primary ceramic particles and binder), and to increase the density of the layer. In an example, the pressure that is applied to the granules 16 by the pressure die 24 ranges from about 10 psi to about 10,000 psi. In another example, the pressure that is applied to the granules 16 by the pressure die 24 ranges from about 100 psi to about 1,000 psi.

As shown in FIG. 1, the printing system 10 also includes an inkjet applicator 28, which may contain the fusing agent disclosed herein. The inkjet applicator 28 may be scanned across the build area platform 12 in the direction indicated by the arrow 30, e.g., along the y-axis. The inkjet applicator 28 may be, for instance, a thermal inkjet printhead, a piezoelectric printhead, etc., and may extend a width of the build area platform 12. While a single inkjet applicator 28 is shown in FIG. 1, it is to be understood that multiple inkjet applicators 28 may be used that span the width of the build area platform 12. Additionally, the inkjet applicators 28 may be positioned in multiple printbars. The inkjet applicator 28 may also be scanned along the x-axis, for instance, in configurations in which the inkjet applicator 28 does not span the width of the build area platform 12 to enable the inkjet applicator 28 to deposit the fusing agent over a large area of a layer of build material fragments. The inkjet applicator 28 may thus be attached to a moving XY stage or a translational carriage (neither of which is shown) that moves the inkjet applicator 28 adjacent to the build area platform 12 in order to deposit the fusing agent in predetermined areas of a layer of the build material fragments that has been formed on the build area platform 12 in accordance with the method(s) disclosed herein. The inkjet applicator 28 may include a plurality of nozzles (not shown) through which the fusing agent is to be ejected.

Each of these physical elements may be operatively connected to a controller 32 of the printing system 10. The controller 32 may control the operations of the build area platform 12, the build material supply 14, the build material distributor 18, the pressing die 24, and the inkjet applicator 28. As an example, the controller 32 may control actuators (not shown) to control various operations of the 3D printing system 10 components. The controller 32 may be a computing device, a semiconductor-based microprocessor, a central processing unit (CPU), an application specific integrated circuit (ASIC), and/or another hardware device. Although not shown, the controller 32 may be connected to the 3D printing system 10 components via communication lines.

The controller 32 manipulates and transforms data, which may be represented as physical (electronic) quantities within the printer's registers and memories, in order to control the physical elements to create the 3D part. As such, the controller 32 is depicted as being in communication with a data store 34. The data store 34 may include data pertaining to a 3D part to be printed by the 3D printing system 10. The data for the selective delivery of the build material granules 16, the fusing agent, etc. may be derived from a model of the 3D part to be formed. For instance, the data may include the locations on each layer of build material fragments that the inkjet applicator 28 is to deposit the fusing agent. In one example, the controller 32 may use the data to control the inkjet applicator 28 to selectively apply the fusing agent. The data store 34 may also include machine readable instructions (stored on a non-transitory computer readable medium) that are to cause the controller 32 to control the amount of build material granules 16 that is supplied by the build material supply 14, the movement of the build area platform 12, the movement of the build material distributor 18, the movement of the pressing die 24, the movement of the inkjet applicator 28, etc.

As shown in FIG. 1, the printing system 10 may also include a heater 35, 35'. In some examples, the heater 35 includes a conventional furnace or oven, a microwave, or devices capable of hybrid heating (i.e., conventional heating and microwave heating). This type of heater 35 may be used for heating the entire pressed cake 46 (see FIG. 2G) after the printing is finished. In other examples, the heater 35' may be a radiative heat source (e.g., a curing lamp) that is positioned to heat each layer 36 (see FIG. 2E) after the fusing agent 38 has been applied thereto. In the example shown in FIG. 1, the heater 35' is attached to the side of the inkjet applicator 28, which allows for printing and heating in a single pass.

Referring now to FIGS. 2A through 2I, an example of the 3D printing method is depicted. Prior to execution of the method 100 or as part of the method 100, the controller 32 may access data stored in the data store 34 pertaining to a 3D part that is to be printed. The controller 32 may determine the number of layers of build material granules 16 that are to be formed and compressed, and the locations at which fusing agent from the inkjet applicator 28 is to be deposited on each of the respective layers.

As shown in FIGS. 2A and 2B, the method 100 includes applying the build material granules 16. In FIG. 2A, the build material supply 14 may supply the build material granules 16 into a position so that they are ready to be spread onto the build area platform 12. In FIG. 2B, the build material distributor 18 may spread the supplied build material granules 16 onto the build area platform 12. The controller 32 may execute control build material supply instructions to control the build material supply 14 to appropriately position the build material granules 16, and may execute control spreader instructions to control the build material distributor 18 to spread the supplied build material granules 16 over the build area platform 12 to form a layer 36 of build material granules 16 thereon. As shown in FIG. 2B, one layer 36 of the build material granules 16 has been applied.

The layer 36 has a substantially uniform thickness across the build area platform 12. In an example, the thickness of the layer ranges from about 50 μm to about 300 μm, although thinner or thicker layers may also be used. For example, the thickness of the layer 36 may range from about 20 μm to about 500 μm, or from about 30 μm to about 300 μm. The layer thickness may be about 2× the granule diameter at a minimum for finer part definition.

Each build material granule 16 includes primary ceramic particles and a binder. The ceramic particles are held (agglomerated) together by the binder to form the build material granules.

In an example, the build material granules 16 have a granule size ranging from about 10 μm to about 200 μm. In another example, the granule size ranges from about 20 μm to about 150 μm. The term "granule size" is used herein to describe the granule build material 16. The granule size generally refers to the diameter or average diameter of the composite granule build material 16, which may vary, depending upon the morphology of the composite. In an example, a respective build material granule 16 may have a morphology that is substantially spherical. A substantially spherical granule 16 (i.e., spherical or near-spherical) has a sphericity of >0.84. Thus, any individual granules 16 having a sphericity of <0.84 are considered non-spherical (irregularly shaped). The granule size of the substantially spherical granule 16 may be provided by its largest diameter, and the granule size of a non-spherical granule 16 may be provided by its average diameter (i.e., the average of multiple dimensions across the granule 16) or by an effective diameter, which is the diameter of a sphere with the same mass and density as the non-spherical granule 16.

In some examples, the build material granule 16 has a hollow center as shown in FIG. 2A. In other examples, the build material 12 has a substantially filled in center.

The primary ceramic particles may be any bare ceramic particles. The bare ceramic particles do not have a coating, such as a chromophore coating, thereon. Examples of suitable primary ceramic particles include metal oxides, inorganic glasses, carbides, nitrides, and borides. Some specific examples include alumina ($Al_2O_3$), $Na_2O/CaO/SiO_2$ glass (soda-lime glass), silicon nitride ($Si_3N_4$), silicon carbide (SiC), silicon dioxide ($SiO_2$), zirconia ($ZrO_2$), titanium dioxide ($TiO_2$), or combinations thereof. As an example, alumina particles with a particle size of <1 μm are utilized as the primary ceramic particles. As an example of one suitable combination, 30 wt % glass may be mixed with 70 wt % alumina.

In an example, the particle size of the primary ceramic particles ranges from 0.01 μm to about 3 μm. In another example, the particle size ranges from 0.05 μm to about 1.5 μm. The particle size of the primary ceramic particles generally refers to the diameter or average diameter of the uncoated ceramic particle, which may vary, depending upon the morphology of the particle. In an example, a respective primary ceramic particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical primary ceramic particle may be provided by its largest diameter, and the particle size of a non-spherical primary ceramic particle may be provided by its average diameter (i.e., the average of multiple dimensions across the particle) or by an effective diameter, which is the diameter of a sphere with the same mass and density as the non-spherical particle.

The ceramic particles may be similarly sized particles or differently sized particles. In the example shown in FIG. 2A, the ceramic particles are similarly sized particles.

The binder may be any material that i) has enough adhesive strength to hold the primary ceramic particles together to form the granules 16 with enough mechanical stability to survive limited handling (e.g., spreading the build material granules 16 into layers), and ii) is at least partially soluble in the primary solvent of the fusing agent such that the build granules 16 are softened by partial dissolution of the binder, or the build material fragments are converted into a slurry of the primary ceramic particles when the binder is fully dissolved.

One key property of the binder used to form the granules 16 is its solubility in the primary solvent used in the fusing agent. The binder solubility in the primary solvent should be higher than 0.5 wt %, when measured at a temperature corresponding to that of the printing environment. In some examples, the binder solubility is higher than 2 wt %. It is to be understood that there is no upper limit on the binder solubility in the primary solvent of the fusing agent, and the higher the solubility, the better.

The binder may be a small molecular species or a short chain polymer that meets the criteria i and ii. Examples of suitable binders include sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($O_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used, however the dissolution kinetics may be slower.

In an example, the binder is present in each granule 16 in an amount ranging from about 0.1 wt % to about 10 wt % based on the wt % of the primary ceramic particles in each granule 16. In another example, the binder is present in each granule 16 in an amount ranging from about 0.3 wt % to about 5 wt % based on the wt % of the primary ceramic particles in each granule 16.

It is to be understood that in some instances the build material 12 consists of the uncoated, primary ceramic particles 40 and binder 42 alone. In other instances, a charging agent and/or flow aid may be added in between the build material granules 16.

Charging agent(s) may be added to suppress tribo-charging. Examples of suitable charging agent(s) include aliphatic amines (which may be ethoxylated), aliphatic amides, quaternary ammonium salts (e.g., behentrimonium chloride orcocamidopropyl betaine), esters of phosphoric acid, polyethylene glycolesters, or polyols. Some suitable commercially available charging agents include HOSTASTAT® FA 38 (natural based ethoxylatedalkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material granules 16.

Flow aid(s) may be added to improve the coating flowability of the build material granules 16. Flow aid(s) may be particularly beneficial when the build material granules 16 are less than 25 μm in granule size. The flow aid improves the flowability of the build material granules 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material granules 16.

The granules 16 may be produced via any suitable method, such as spray drying.

Referring now to FIGS. 2C and 2D, the method 100 continues by applying pressure to the build material granules 16 (FIG. 2C) in order to crush, break up, pulverize, etc. the granules 16 to form build material fragments 16' (FIG. 2D). The fragments 16' may include individual primary ceramic particles and/or some primary ceramic particles that are still bound together. More particularly, the pressure that is applied is enough to cause the binder to cease binding at least some of the primary ceramic particles together, and to compact the primary ceramic particles into a denser packing that will more readily sinter. Following the application of the pressure from the pressing die 24, the fragments 16' may have particle sizes that smaller than the granular sizes, and, in some instances, are less than or equal to 3 μm, e.g., between about 0.1 μm and 0.5 μm. These smaller fragments 16' are more compact and have less voids therebetween, which renders them more easily sinterable than the larger granules 16.

In the example shown in FIG. 2C, the pressing die 24 is moved in the direction indicated by the arrow 26 until it contacts and applies a sufficient force onto the layer 36 of build material granules 16. The pressure die 24 may be responsive to the controller 32 which executes pressing die instructions.

The application of pressure may be accomplished in other manners. For instance, instead of moving the pressing die 24 in the direction denoted by the arrow 26, the build area platform 12 may be moved in a direction opposite direction to that denoted by the arrow 26. In other words, the build area platform 12 may be moved toward the pressing die 24 such that pressure is applied onto the build material granules 16 by the movement of the build area platform 12. In another example, the build material distributor 18 may apply the pressure to the granules 16. For instances, the build material distributor 18 may apply the sufficient amount of pressure during an initial pass over the layer 36, or during a second or subsequent pass over the build area platform 12 after having spread the granules 16, e.g., during a return trip back to its original position. The use of the build material distributor 18 to apply the pressure may be desirable when the granules 16 have first been softened by the applied fusing agent 38 (described in more detail below).

Through application of the pressure by the pressing die 24 and an opposing pressure applied by the build area platform 12, the density of the layer 36 may also be increased. When the granules 16 are crushed into fragments 16', voids within and/or between the granules 16 are reduced or eliminated. This densifies the layer 36, which may improve a density of the final printed part. The pressed layer 36 may also be in a form that is more receptive to receive the fusing agent.

In one example of the method, after the build material granules 16 are crushed to form the fragments 16', the fusing agent 38 is selectively applied on a portion 40 of the build material fragments 16', as shown in FIG. 2E. As illustrated in FIG. 2E, the fusing agent 38 may be dispensed from the inkjet applicator 28.

The controller 32 may execute instructions to control the inkjet applicator 28 (e.g., in the directions indicated by the arrow 30) to deposit the fusing agent 38 onto predetermined portion(s) 40 of the fragments 16' that are to become part of a green body and are to ultimately be sintered to form the 3D part. The inkjet applicator 28 may be programmed to receive commands from the controller 32 and to deposit the fusing agent 38 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 2E, the inkjet applicator 28 selectively applies the fusing agent 38 on those portion(s) 40 of the layer 36 that are to be fused to become the first layer of the 3D part 38. As an example, if the 3D part that is to be formed is to be shaped like a cube or cylinder, the fusing agent 38 will be deposited in a square pattern or a circular pattern (from a top view), respectively, on at least a portion of the layer 36 of the build material fragments 16'. In the example shown in FIG. 2E, the fusing agent 38 is deposited in a square pattern on the portion 40 of the layer 36 and not on the portions 42.

The fusing agent 38 includes at least the primary solvent and the latent binder. In some instances, the fusing agent 38 includes the primary solvent and the latent binder, without any other components.

The primary solvent in the fusing agent 38 is capable of at least partially dissolving the binder in the build material fragments 16'. For example, when water is used as the primary solvent, the binder of the fragments 16'/granules 16 is water soluble. In other examples, the fusing agent 38 includes a non-aqueous solvent as the primary solvent. The non-aqueous solvent may be used as the primary solvent when the binder of the fragments 16'/granules 16 is a non-polar material. The non-aqueous solvent may be a non-polar or medium polar primary solvent, such as ethanol, acetone, n-methyl pyrrolidone, and/or aliphatic hydrocarbons.

The fusing agent 38 also includes the latent binder. The latent binder is a sacrificial intermediate binder in that it is present in various stages of the green body that is formed, and then is ultimately removed (through thermal decomposition) from the final sintered 3D part.

In the examples disclosed herein, the latent binder is a colloidal dispersion of polymer particles in the primary solvent, and may be referred to as latex, an emulsion polymer, or a polymer particle dispersion. The polymer particles may have several different morphologies. For example, the polymer particles may be made of a hydrophobic core surrounded by a continuous hydrophilic shell. For another example, the polymer particle morphology may resemble a raspberry, in which the hydrophobic core is surrounded by several smaller hydrophilic particles that are attached to the core. For still another example, the polymer particles may include 2, 3, or 4 particles that are at least partially attached to one another.

In the examples disclosed herein, the polymer particles of the polymer particle dispersion are heteropolymers or copolymers. The heteropolymers may include a more hydrophobic component and a more hydrophilic component. In these examples, the hydrophilic component renders the particles dispersible in the fusing agent 38, while the hydrophobic component is capable of coalescing upon exposure to heat in order to temporarily bind the primary ceramic particles of the fragments 16' together to form the green body.

Examples of monomers that may be used to form the hydrophobic component include C1 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof.

In the heteropolymers disclosed herein, the hydrophobic component(s) make up from about 85% to about 100% of the polymer, and the hydrophilic component(s) make up from about 0.1% to about 15% of the polymer.

In an example, the selected monomer(s) is/are polymerized to form the desirable heteropolymer. Any suitable polymerization process may be used. For example, core-shell (hydrophobic-hydrophilic) polymer particles can be formed by any of a number of techniques, such as: i) grafting a hydrophilic polymer onto the surface of a hydrophobic polymer, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The polymer particles of the latent binder have a particle size that can be jetted via thermal inkjet printing or piezoelectric printing. In an example, the particle size of the polymer particles ranges from about 10 nm to about 300 nm.

The glass transition temperature $T_g$ of the bulk material (e.g., the more hydrophobic portion) of the polymer particles may range from 60° C. to about 100° C. The glass transition temperature $T_g$ of the bulk material may be any temperature that enables the polymer particles to be inkjet printed without becoming too soft at the printer operating temperatures.

The weight average molecular weight of the polymer particles of the latent binder may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

The polymer particles may be present in the fusing agent 38 in an amount ranging from about 2 wt % to about 30 wt %, or from about 3 wt % to about 20 wt %, or from about 5 wt % to about 15 wt %.

As mentioned above, the fusing agent 38 may include the latent binder and the primary solvent alone. In these examples, the primary solvent makes up the balance of the fusing agent. In other examples, the fusing agent 38 may include other ingredients, depending, in part, upon the inkjet applicator 28 that is to be used to dispense the fusing agent 38. Examples of other suitable fusing agent ingredients include co-solvent(s), surfactant(s), biocide(s), anti-kogation agent(s), viscosity modifier(s), pH adjuster(s) and/or sequestering agent(s). The presence of a co-solvent and/or a surfactant in the fusing agent 38 may assist in obtaining a particular wetting behavior with the build material granules 12.

Classes of organic co-solvents that may be used in the water-based fusing agent 38 include aliphatic alcohols, aromatic alcohols, dials, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the fusing agent 38 in a total amount ranging from about 1 wt % to about 50 wt % based upon the total wt % of the fusing agent 38, depending upon the jetting architecture of the inkjet applicator 28.

Surfactant(s) may be used to improve the wetting properties and the jettability of the fusing agent 38. Examples of suitable surfactants include a self-emulsifiable, nonionic wetting agent based on acetylenic dial chemistry (e.g., SURFYNOL® SEF from Air Products and Chemicals, Inc.), a nonionic fluorosurfactant (e.g., CAPSTONE@ fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 38 may range from about 0.5 wt % to about 2.5 wt % based on the total wt % of the fusing agent 38.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % (as indicated by regulatory usage levels) with respect to the total wt % of the fusing agent 38.

An anti-kogation agent may be included in the fusing agent 38. Kogation refers to the deposit of dried ink (e.g., fusing agent 38) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAEOS™ O3A or CRODA-FOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 38 may range from greater than 0.20 wt % to about 0.62 wt % based on the total wt % of the fusing agent 38. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the fusing agent 38. From 0.01 wt % to 2 wt % of each of these components, for example, can be used. Viscosity modifiers and buffers may also be present, as well as other additives known to those skilled in the art to modify properties of the fusing agent 38 as desired. Such additives can be present in amounts ranging from about 0.01 wt % to about 20 wt %.

It is to be understood that a single fusing agent 38 may be selectively applied to pattern the layer 36, or multiple fusing agents 38 may be selectively applied to pattern the layer 36. When multiple fusing agents 38 are utilized, the primary solvent of each of the fusing agents 36 may be capable of at least partially dissolving the binder in the build material fragments 16' and may include an example of the latent binder that can be rendered insoluble (in water or a solvent) upon exposure to heat.

When the fusing agent 38 is selectively applied in the desired portion(s) 40, the binder of the fragments 16' in contact with the fusing agent 36 at least partially dissolves. At least partial dissolution of the binder from the fragments 16' helps to weaken the remnants (fragments 16') of the original build material granules 16, and also allows the latent binder (present in the fluid of the fusing agent 38) to infiltrate the inter-particles spaces among the remnants (i.e., the remaining primary ceramic particles).

The volume of the fusing agent 38 that is applied per unit of fragments 16' in the patterned portion 40 may be sufficient to fill a major fraction, or most of the porosity existing within the thickness of the portion 40 of the layer 36.

It is to be understood that in portions 42 of the build material fragments 16' that do not have the fusing agent 38 applied thereto, the binder of the fragments 16' does not dissolve and the latent binder is not introduced thereto. As such, these portions do not become part of the green body that is ultimately formed.

The processes shown in FIGS. 2A through 2E may be repeated to iteratively build up several patterned layers and to form the latent green body 44 (see FIG. 2G).

FIG. 2F illustrates the initial formation of a second layer of build material granules 16 on the layer 36 patterned with fusing agent 38. In FIG. 2F, following deposition of the fusing agent 38 onto predetermined portion(s) 40 of the layer 36 of build material fragments 16', the controller 32 may execute instructions to cause the build area platform 12 to be moved a relatively small distance in the direction denoted by the arrow 20. In other words, the build area platform 12 may be lowered to enable the next layer of build material granules 16 to be formed. For example, the build material platform 12 may be lowered a distance that is equivalent to the height of the layer 36. In addition, following the lowering of the build area platform 12, the controller 32 may control the build material supply 14 to supply additional build material granules 16 (e.g., through operation of an elevator, an auger, or the like) and the build material distributor 18 to form another layer of build material granules 16 on top of the previously formed layer 36 with the additional build material granules 16. The newly formed layer may be exposed to applied pressure to crush the granules 16 and form fragments 16', and then the newly formed fragments 16' may be patterned with fusing agent 38.

Referring back to FIG. 2E, in another example of the method 100, the layer 36 may be exposed to heating using heater 35' after the fusing agent 38 is applied to the layer 36 and before another layer is formed. The heater 35' may be used for activating the latent binder during printing layer-by-layer, and for producing a stabilized and cured green body layer. Heating to form the cured green body layer may take place at a temperature that is capable of activating (or curing) the latent binder, but that is not capable of melting or sintering the primary ceramic particles. Examples of suitable activation temperatures are provided below. In this example, the processes shown in FIGS. 2A through 2E (including the heating of the layer 36) may be repeated to iteratively build up several cured layers and to produce the cured green body 44'. The cured green body 44' can then be exposed to the processes described in reference to FIGS. 2H and 2I.

Although the method 100 has been described with the layer of build material granules 16 being pressed prior to receiving the fusing agent 38, it is to be understood that the method 100 may additionally or alternatively include applying the fusing agent 38 onto the layer 36 of build material granules 16 (before being crushed into fragments 16') and then pressing the layer 36 with the pressing die 24 to form the fragments 16'. In this example, the fusing agent 38 may soften the build material granules 16 by at least partially dissolving the binder therein. Softening the build material granules 16 may render the granules 16 more readily crushable and may facilitate their destruction (homogenization) under the applied pressure.

Repeatedly forming, pressing, and patterning (or forming, patterning, and pressing) new layers results in the formation of a pressed cake 46, as shown in FIG. 2G, which includes the green body 44 residing within the non-patterned portions 42 of each of the layers 36 of build material fragments 16'. The green body 44 is a volume of the pressed cake 46 that is filled with the build material fragments and the latent binder (residing in fluid, which includes the remaining ingredients of the fusing agent 38 and dissolved binder from the patterned fragments 16') within the inter-particle spaces. The remainder of the pressed cake 46 is made up of the non-patterned fragments 16'.

Also as shown in FIG. 2G, the pressed cake 46 may be exposed to heat or radiation to generate heat, as denoted by the arrows 48. The heat applied may be sufficient to activate the latent binder in the green body 44 and to produce a stabilized and cured green body 44'. In one example, the heat source 35 may be used to apply the heat to the pressed cake 46. In the example shown in FIG. 2G, the pressed cake 46 may be removed from the build area platform 12 prior to being heated by the heat source 35. Alternatively, the pressed cake 46 may remain on the build area platform 12 while being heated by the heat source 35. Any of the previously described heat sources 35 may be used.

Heating to form the cured green body 44' may take place at a temperature that is capable of activating (or curing) the latent binder, but that is not capable of sintering the primary ceramic particles or of thermally degrading the latent binder. In an example, the activation temperature is a temperature above the glass transition temperature, $T_g$, (or film forming temperature) of the bulk material of the polymer particles of the latent binder and below the thermal decomposition temperature of the latent binder (i.e., below a temperature threshold at which thermal decomposition occurs). For a majority of suitable latex-based latent binders, the upper limit of the curing temperature ranges from about 250° C. to about 270° C. Above this temperature threshold, the latent binder would chemically degrade into volatile species and leave the green body, and thus would stop performing its function. For core-shell polymer particles, the activation temperature may be above the $T_g$ of the hydrophobic polymer core and below the thermal decomposition temperature of the core-shell polymer particle. As an example, the latent binder activation temperature may range from about 50° C. to about 200° C. As another example, the latent binder activation temperature may be about 90° C.

Heating at the activation temperature causes the latent binder to coalesce into a continuous polymer phase among the primary ceramic particles of the green body 44. The continuous polymer phase may act as a heat-activated adhesive between the primary ceramic particles to form the stabilized, cured green body 44'. The continuous polymer phase of the cured green body 44' exhibits high water or solvent resistance.

Heating to form the cured green body 44' also results in the evaporation of most of the fluid from the green body 44. The evaporated fluid may include the fusing agent components as well as the dissolved binder of the granules 16. Fluid evaporation may result in some densification, through capillary action, of the cured green body 44'.

The stabilized, cured green body 44' exhibits handleable mechanical durability.

The pressed cake 46 may then be exposed to a wet extraction process to remove the non-patterned build material fragments 16' from the stabilized, cured green body 44'. The wet extraction process is shown in FIG. 2H.

The primary ceramic particles of the non-patterned build material fragments 16' are loosely held together by the water or solvent soluble binder (i.e., the binder of the original granules 16). In contrast, the cured green body 44' contains the water-insoluble or solvent-insoluble cured binder. This combination of materials in the pressed cake 46 enables the wet extraction process to readily remove the non-patterned, non-bound build material fragments 16' and leave the cured green body 44' intact. As shown in FIG. 2H, the non-patterned layers 36 of the pressed cake 46 (i.e., the fragments 16' not exposed to fusing agent 38) may be removed from the cured green body 44' by exposure to water or another solvent.

Water or solvent exposure may be accomplished by spraying the pressed cake 46 with water or solvent using wet extraction tool(s) 50, such as a hose and a sprayer, a spray gun, etc. Water or solvent exposure may also be accomplished by sonicating the pressed cake 46 in a water or solvent bath. Water or solvent exposure may also be accomplished by soaking the pressed cake 46 in water or the solvent.

Wet extraction of non-bound build material fragments 16' is gentler, when compared to dry methods, such as sand blasting, on fine structural features (e.g., sharp angles, surface texture, etc). Wet extraction results in the formation of a slurry of the build material fragments 16', and this slurry can be recycled back into build material granules 16. Moreover, wet extraction results in less powder in the air.

After the wet extraction of the cured green body 44', the cured green body 44' may be heated to remove the water-insoluble or solvent-insoluble cured binder, and then sintered to form the final 3D part 52, as shown in FIG. 2I. Heating to de-bind and heating to sinter take place at two different temperatures, where the temperature for de-binding is higher than the temperature for sintering. Both the de-binding and the sintering heating stages are generally depicted in FIG. 2I, where heat or radiation to generate heat may be applied as denoted by the arrows 48 from the heat source 35.

Heating to de-bind is accomplished at a first temperature that is sufficient to thermally decompose the water-insoluble or solvent-insoluble cured binder. As such, the temperature for de-binding depends upon the material of the polymer particles of the latent binder. In an example, the temperature ranges from about 250° C. to about 600° C. In another example, the temperature ranges from about 280° C. to about 450° C. The water-insoluble or solvent-insoluble cured binder may have a clean thermal decomposition mechanism (e.g., leaves <5 wt % solid residue of the initial binder, and in some instances <1 wt % solid residue of the initial binder). The smaller residue percentage (e.g., close to 0%) is more desirable. During the de-binding stage, the water-insoluble or solvent-insoluble cured binder decomposes first intro shorter molecular fragments, which turn into a liquid phase of lower viscosity. Capillary pressure developing during evaporation of this liquid pulls the primary ceramic particles together leading to further densification and formation of a densified green body 44".

Heating to sinter is accomplished at a second temperature that is sufficient to sinter the remaining primary ceramic particles. During heating/sintering, the densified green body 44" may be heated to a temperature ranging from about 40% to about 90% of the melting temperature of the primary ceramic particles. In an example, the densified green body 44" may be heated to a temperature ranging from about 50% to about 80% of the melting temperature of the primary ceramic particles. In another example, the densified green body 44" may be heated to a temperature ranging from about 60% to about 85% of the melting temperature of the primary ceramic particles. The sintering heating temperature thus depends upon the primary ceramic particles that are utilized. The sintering heating temperature may also depend upon the particle size and time for sintering (i.e., high temperature exposure time). As an example, the sintering temperature is at least 900° C. Examples of sintering temperatures for SiC and $Si_3N_4$ primary ceramic particles may be greater than 2000° C., and examples of sintering temperatures for $Al_2O_3$ may range from about 1400° C. to about 1600° C. Heating at a suitable temperature sinters and fuses the primary ceramic particles to form a completed 3D part 52, which may be even further densified relative to the densified green body 44". For example, as a result of sintering, the density may go from 50% density to 90% density.

The length of time at which the heat 48 (for each of de-binding and sintering) is applied may be dependent, for example, on one or more of: characteristics of the heat or radiation source 35, characteristics of the water-insoluble or solvent-insoluble cured binder, and/or characteristics of the primary ceramic particles.

Although not shown, the operations depicted in FIGS. 2G through 2I may be automated and the controller 32 may control the operations.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 μm to about 300 μm should be interpreted to include the explicitly recited limits of 50 μm to 300 μm, as well as individual values, such as 55 μm, 125 μm, 200.5 μm, 295 μm, etc., and sub-ranges, such as from about 75 μm to about 275 μm, from about 60 μm to about 225 μm, etc. Furthermore, when "about" is utilized to describe a value, this is meant to encompass minor variations (up to +1-10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
   applying build material granules, each of the build material granules including a plurality of primary ceramic particles agglomerated together by a binder that is at least partially soluble in a primary solvent of a fusing agent;
   applying pressure to the build material granules, thereby crushing the build material granules;
   selectively applying the fusing agent on at least a portion of the build material granules or the crushed build material granules, thereby patterning the build material granules or the at least the portion of the crushed build material granules, and introducing a latent binder to the at least the portion of the build material granules or the crushed build material granules;
   repeating the applying of the build material granules, the applying of the pressure, and the selectively applying of the fusing agent to create a green body; and
   activating the latent binder by heating the green body, thereby producing a cured green body.

2. The 3D printing method as defined in claim 1, further comprising:

exposing the cured green body to a wet extraction process, thereby removing any non-bound crushed build material granules;

heating the cured green body, thereby thermally decomposing the latent binder to form a densified green body; and sintering the densified green body to form a 3D object.

3. The 3D printing method as defined in claim 2 wherein the wet extraction process includes:

sonicating the cured green body in water; or spraying the cured green body with water and washing away the non-bound crushed build material granules from a surface of the cured green body.

4. The 3D printing method as defined in claim 2 wherein the heating of the cured green body takes place at a first temperature, and wherein the sintering of the densified green body takes place at a second temperature that is higher than the first temperature.

5. The 3D printing method as defined in claim 4 wherein the first temperature ranges from about 250° C. to about 600° C., and wherein the second temperature is at least 900° C.

6. The 3D printing method as defined in claim 1 wherein the latent binder is a polymer particle dispersion.

7. The 3D printing method as defined in claim 6 wherein:

the polymer particle dispersion includes core-shell polymer particles, each of the core-shell polymer particles having a hydrophobic polymer core and a hydrophilic polymer shell; and the activating of the latent binder is accomplished by exposing the green body to a temperature above a film forming temperature of the hydrophobic polymer core and below a threshold temperature at which thermal decomposition of the latent binder occurs.

8. The 3D printing method as defined in claim 7 wherein the temperature ranges from about 50° C. to about 200° C.

9. The 3D printing method as defined in claim 6 wherein the activating of the latent binder evaporates fluid from the green body and coalesces polymer particles of the polymer particle dispersion.

10. The 3D printing method as defined in claim 1 wherein the pressure applied to the build material granules ranges from about 10 psi to about 10,000 psi.

11. The 3D printing method as defined in claim 1 wherein the applying of the pressure is accomplished by a pressing die positioned above the applied build material granules.

12. The 3D printing method as defined in claim 1 wherein:

the applying of the pressure occurs before the selectively applying of the fusing agent; or the selectively applying of the fusing agent occurs before the applying of the pressure.

13. A three-dimensional (3D) printing method, comprising:

applying build material granules, each of the build material granules including a plurality of primary ceramic particles agglomerated together by a binder that is at least partially soluble in a primary solvent of a fusing agent;

applying pressure to the build material granules, thereby crushing the build material granules;

selectively applying the fusing agent on at least a portion of the build material granules or the crushed build material granules, thereby patterning the build material granules or the at least the portion of the crushed build material granules, and introducing a latent binder to the at least the portion of the build material granules or the crushed build material granules;

activating the latent binder by heating the crushed and patterned build material granules to form a cured green body layer; and repeating the applying of the build material granules, the applying of the pressure, the selectively applying of the fusing agent, and the activating of the latent binder to form a cured green body.

14. A three-dimensional (3D) printing system, comprising:

a supply of build material granules, each of the build material granules including a plurality of primary ceramic particles agglomerated together by a binder that is at least partially soluble in a primary solvent of a fusing agent;

a build material distributor;

a pressing die;

a supply of the fusing agent, wherein the fusing agent further includes a latent binder;

an inkjet applicator for selectively dispensing the fusing agent;

a controller;

a non-transitory computer readable medium having stored thereon computer executable instructions to cause the controller to control the build material distributor, the pressing die, and the inkjet applicator to iteratively form multiple layers of build material granules which are applied by the build material distributor, pressed by the pressing die, and have received the fusing agent; and a heater to activate the latent binder in each of the multiple layers to produce a cured green body.

15. The 3D printing system as defined in claim 14 wherein:

the primary ceramic particles are metal oxide ceramics, inorganic glasses, carbides, nitrides, borides, or a combination thereof;

the binder is a sugar, a sugar alcohol, a polymeric sugar, an oligomeric sugar, a polycarboxylic acid, polysulfonic acid, a water soluble polymer containing carboxylic or sulfonic moieties, a polyether alkoxy silane, or a combination thereof; and the latent binder is a polymer particle dispersion.

* * * * *